United States Patent
Matejko-Anger

(10) Patent No.: US 9,469,224 B2
(45) Date of Patent: Oct. 18, 2016

(54) CABLE FIXING ELEMENT ON A SPRING MAT FOR A VEHICLE SEAT, SPRING MAT, AND VEHICLE SEAT

(71) Applicant: JOHNSON CONTROLS GMBH, Burscheid (DE)

(72) Inventor: Sylwia Matejko-Anger, Wermelskirchen (DE)

(73) Assignee: JOHNSON CONTROLS GMBH, Burscheid (DE)

(*) Notice: Subject to any disclaimer, the term of this patent is extended or adjusted under 35 U.S.C. 154(b) by 11 days.

(21) Appl. No.: 14/369,809

(22) PCT Filed: May 6, 2013

(86) PCT No.: PCT/EP2013/059365
§ 371 (c)(1),
(2) Date: Jun. 30, 2014

(87) PCT Pub. No.: WO2013/167522
PCT Pub. Date: Nov. 14, 2013

(65) Prior Publication Data
US 2014/0367901 A1 Dec. 18, 2014

(30) Foreign Application Priority Data
May 11, 2012 (DE) .................. 10 2012 009 543

(51) Int. Cl.
| | |
|---|---|
| *B60N 2/64* | (2006.01) |
| *B60N 2/44* | (2006.01) |
| *B60N 2/70* | (2006.01) |
| *B60N 2/54* | (2006.01) |

(Continued)

(52) U.S. Cl.
CPC . *B60N 2/44* (2013.01); *B60N 2/54* (2013.01); *B60N 2/7094* (2013.01); *F16L 3/1222* (2013.01); *B60N 2002/0264* (2013.01)

(58) Field of Classification Search
CPC ............ A47C 7/02; A47C 7/30; B60N 2/44; B60N 2/54; B60N 2/64; B60N 2/70; B60N 2/72; F16L 3/1222
USPC ................ 267/131, 142–147, 105, 110–112; 248/618–620, DIG. 903; 297/452.1, 297/452.52; 5/701, 719, 728–730
See application file for complete search history.

(56) References Cited

U.S. PATENT DOCUMENTS 2,440,001 A * 4/1948 Blumensaadt ........... A47C 7/30
267/107
3,386,725 A * 6/1968 Fujikawa .................. A47C 7/30
267/110

(Continued)

FOREIGN PATENT DOCUMENTS

| DE | 39 37 407 A1 | 5/1991 |
|---|---|---|
| DE | 10 2006 032 038 A1 | 1/2008 |

(Continued)

*Primary Examiner* — Christopher Schwartz
(74) *Attorney, Agent, or Firm* — McGlew and Tuttle, P.C.

(57) ABSTRACT

A fixing element (30), for fixing a cable (50) to a spring mat (12) of a vehicle seat (1), includes a retaining region (32) and at least one gripping arm (34, 36), which can be elastically preloaded such that a cable (50) located between the retaining region (32) and the at least one gripping arm (34, 36) is pressed against the retaining region (32) by the at least one gripping arm (34, 36). The spring mat (12), for a vehicle seat (1), includes a fixing element (30). A vehicle seat (1) includes the spring mat (12) and/or a fixing element (30).

18 Claims, 2 Drawing Sheets

(51) Int. Cl.
*F16L 3/12* (2006.01)
*B60N 2/02* (2006.01)

(56) References Cited

U.S. PATENT DOCUMENTS

| | | | | |
|---|---|---|---|---|
| 4,055,865 | A * | 11/1977 | Crosby | A47C 31/06 267/107 |
| 4,171,125 | A * | 10/1979 | Griffiths | A47C 7/32 267/102 |
| 6,446,945 | B1 * | 9/2002 | Wisniewski | B60N 2/7094 267/105 |
| 7,775,603 | B2 * | 8/2010 | Mundell | B60N 2/7052 297/452.52 |
| 8,691,370 | B2 * | 4/2014 | Brill | A47C 7/22 297/452.1 |
| 2004/0195743 | A1 * | 10/2004 | Pfau | A47C 7/285 267/142 |
| 2009/0108646 | A1 * | 4/2009 | Chida | B60N 2/4228 297/216.13 |
| 2010/0295348 | A1 * | 11/2010 | Takayasu | B60N 2/4885 297/216.12 |
| 2011/0278886 | A1 * | 11/2011 | Nitsuma | B60N 2/4228 297/216.13 |

FOREIGN PATENT DOCUMENTS

| | | |
|---|---|---|
| DE | 10 2008 043 196 A1 | 4/2010 |
| DE | 10 2011 084 883 A1 | 4/2012 |
| DE | 10 2012 008 166 A1 | 6/2013 |
| EP | 1 593 547 A1 | 11/2005 |
| FR | 2 861 600 A1 | 5/2005 |
| GB | 388 490 A | 3/1933 |
| JP | H11-321414 A | 11/1999 |
| JP | 2001 336 673 A | 12/2001 |
| JP | 2002 095 544 A | 4/2002 |
| WO | 03/045732 A1 | 6/2003 |

* cited by examiner

CABLE FIXING ELEMENT ON A SPRING MAT FOR A VEHICLE SEAT, SPRING MAT, AND VEHICLE SEAT

CROSS REFERENCE TO RELATED APPLICATIONS

This application is a United States National Phase Application of International Application PCT/EP2013/059365, filed May 6, 2013, and claims the benefit of priority under 35 U.S.C. §119, of German Patent Application DE 10 2012 009 543.0, filed May 11, 2012, the entire contents of which are incorporated herein by reference.

FIELD OF THE INVENTION

The invention relates to a fixing element for fixing a cable to a spring mat of a vehicle seat. The invention further relates to a spring mat for a vehicle seat. The invention further relates to a vehicle seat.

BACKGROUND OF THE INVENTION

A vehicle seat comprising a spring mat is disclosed in EP 1 593 547, A1. The vehicle seat comprises a backrest and a seat part. For increasing the seating comfort, the spring mat is attached to the seat part, said spring mat comprising a plurality of elastically deformable spring wires which extend approximately parallel to one another in a meandering manner in the direction of travel. When loaded by the weight of an occupant, the spring wires of the spring mat are deflected downward and in this manner produce an elasticity of the seat part. A similarly-acting spring mat is also provided inside the backrest of the vehicle seat.

The spring wires of the spring mat are connected together by means of a plurality of connecting elements made of plastics material. The connecting elements have holes in which additional elements may be fixed. In this case, a cable is fixed to a connecting element of the spring mat by means of a cable tie which is pulled through such a hole.

For fixing the cable to the connecting element, the cable tie has to be pulled through the hole and wound around the cable. The mounting effort for fixing the cable to the spring mat is thus relatively significant.

SUMMARY OF THE INVENTION

An object of the invention is to reduce the mounting effort for fixing a cable to a spring mat of a vehicle seat and to reduce the costs associated therewith.

According to the invention, the fixing element for fixing a cable to a spring mat of a vehicle seat comprises a retaining region and at least one gripping arm which may be elastically preloaded such that a cable located between the retaining region and the at least one gripping arm is pressed against the retaining region by the at least one gripping arm.

For mounting the cable on the spring mat, said cable simply has to be pressed against the retaining region of the fixing element and the gripping arm pulled below the cable. Subsequently, the cable is fixed between the gripping arm and the retaining region. The mounting effort is thus advantageously simplified. Also, an additional cable tie is not required.

In an alternative embodiment, the gripping arm is designed to be elastic such that, when the cable is mounted, it is initially deflected by said cable. Once the cable has reached the end position on the retaining region, due to its elasticity the gripping arm slides automatically past the cable, below the cable. As a result, the gripping arm does not need to be pulled below the cable and the mounting is simplified even further.

In this case, the gripping arm is advantageously pivotable about a pivot axis, whereby it is able to be pulled relatively easily below the cable.

According to an advantageous embodiment of the invention, the gripping arm and the retaining region adjoin an edge region which may be fixed to a spring wire of a spring mat. Thus no additional part is required for attaching the fixing element to the spring mat.

In this case, the retaining region, the gripping arm and the edge region are advantageously designed in one piece, whereby the production of the fixing element is simplified.

According to an advantageous embodiment of the invention, the retaining region is arranged between a first edge region and a second edge region.

In this case, advantageously a first gripping arm adjoins the first edge region and a second gripping arm adjoins the second edge region, wherein the free end of the first gripping arm faces the second edge region and the free end of the second gripping arm faces the first edge region. As a result, the cable is enclosed and securely held on three sides by the first gripping arm, by the second gripping arm and by the retaining region.

According to a further embodiment of the invention, the retaining region has a first connecting piece and a second connecting piece which are adjacent to the gripping arm. As a result, the cable is additionally stabilized in its position.

For improved fixing of the cable, in this case the first gripping arm and/or the second gripping arm and/or the first connecting piece and/or the second connecting piece have pointed projections for fixing the cable. Said pointed projections are in this case attached to the surface of the gripping arms and the connecting pieces facing the cable.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
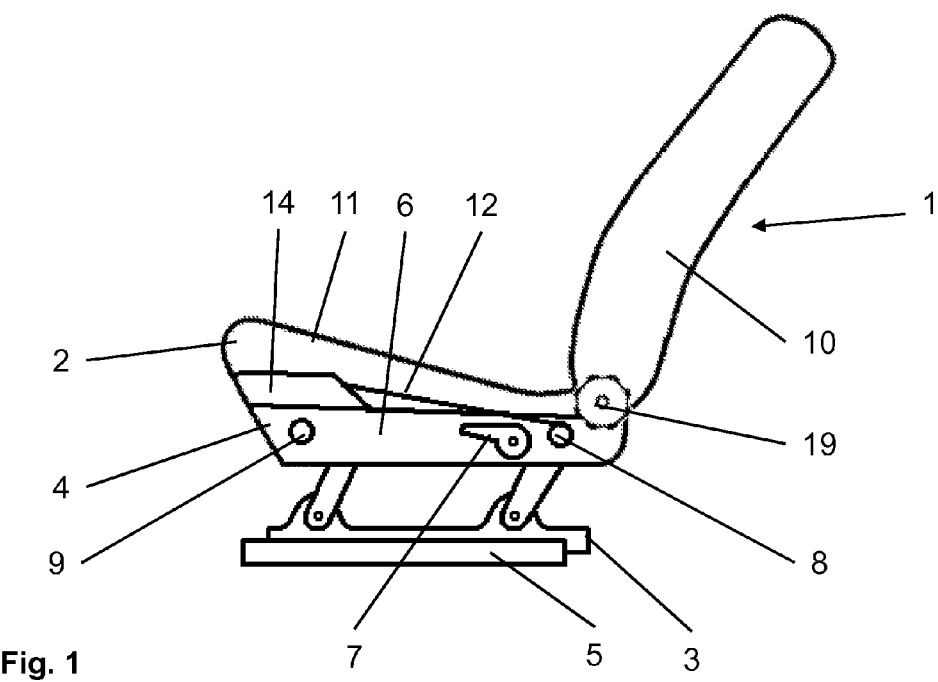
FIG. 1 is a schematic view of a vehicle seat.

Referring to the drawings in particular, a vehicle seat 1 for a motor vehicle has a seat part 2 and a backrest 10 attached thereto which is able to be adjusted in inclination.

The arrangement of the vehicle seat 1 inside the vehicle and the usual direction of travel thereof define the directional information used hereinafter. In this case, a direction oriented perpendicular to the ground is denoted hereinafter as the vertical direction and a direction perpendicular to the vertical direction and perpendicular to the direction of travel is denoted hereinafter as the transverse direction.

By means of a laterally arranged backrest adjustment fitting 19 which may be operated manually, the backrest 10 is able to be adjusted in inclination, which means that the angle between the seat part 2 and the backrest 10 is able to be adjusted. Alternatively, an electric drive is also conceivable.

By means of a height adjuster, the height of the seat part 2 and, in the present case and at the same time, that of the backrest 10 of the vehicle seat 1 are able to be adjusted above the vehicle floor. In the present case, a drive device 7 which is able to be operated manually is provided for driving the height adjuster. Alternatively, an electric drive is also conceivable.

The vehicle seat 1 is able to be longitudinally adjusted by means of a longitudinal adjuster, which comprises two lower rails 5 connected to the vehicle floor as well as two upper rails 3 connected to the vehicle seat 1, which means that the seat part 2 is able to be adjusted together with the backrest 10 in the longitudinal direction which approximately corresponds to the direction of travel. To this end, each of the upper rails 3 is displaceably guided in respectively one of the lower rails 5 extending parallel in the longitudinal direction and by means of a locking device is able to be locked to the respective lower rail 5. Alternatively, an electric drive is also conceivable here.

In this case, the longitudinal direction extends perpendicular to the transverse direction, but in the present case slightly inclined relative to the direction of travel and thus also approximately perpendicular to the vertical direction.

The seat part 2 comprises a seat frame 4 which comprises two side parts 6 extending approximately in the direction of travel as well as a rear transverse tube 8 extending in the transverse direction and attached in the rear region of the seat frame 4 in the direction of travel. A further front transverse tube 9 also extending in the transverse direction is arranged in the front region of the seat frame 4 in the direction of travel. The rear transverse tube 8 and the front transverse tube 9 are connected to the side parts 6 of the seat frame 4.

The seat part 2 further comprises a seat shell 14 which bears against the side parts 6 and against the front transverse tube 9 of the seat frame 4. A spring mat 12 is attached to the seat shell 14 and to the rear transverse tube 8 of the seat frame 4, said spring mat comprising a plurality of spring wires 20. A seat cushion 11 is provided on the side of the seat shell 14 and the spring mat 12 remote from the vehicle floor, said seat cushion being configured as a foamed part.

Also, the backrest 10 is upholstered with a foamed part and, as in the case of the seat cushion 11, covered by a cover. The seat cushion 11 and the spring mat 12 considerably increase the seating comfort for an occupant of the vehicle seat 1.

The spring wires 20 of the spring mat 12 are designed in a meandering manner and substantially extend in the longitudinal direction. This means that, along the length of a spring wire 20, regions extending approximately in the longitudinal direction alternate with regions extending approximately in the transverse direction. In the present case, each spring wire 20 is connected to the seat part 2 at exactly two points which are spaced apart from one another in the longitudinal direction. The spring wires 20 are able to be elastically deformed. When loaded by the weight of an occupant, the spring wires 20 of the spring mat 12 are deflected downwardly in the vertical direction and in this manner produce an elasticity of the seat part 2.

The spring wires 20 of the spring mat 12 have one respective first fixing region 22, by means of which they are connected to the seat shell 14. Moreover, the spring wires 20 have one respective second fixing region 24, by means of which they are connected to the rear transverse tube 8 of the seat frame 4. The second fixing region 24 of each spring wire 20 is bent in the shape of a hook which encloses the rear transverse tube 8 of the seat frame 4. Additionally, connecting elements 60 are provided which in the present case consist of plastics material and which connect together two or more spring wires 20 in the transverse direction.

Moreover, fixing elements 30 are attached to the spring wires 20 of the spring mat 12, said fixing elements serving for fixing a cable 50. In the present case, the cable 50 is an electric cable for supplying power to a seat heating system. However, the cable may also be an electric cable for seat adjustment or even a Bowden cable.

The direction in which the center axis of the cable 50 extends in the vicinity of the fixing element 30 is denoted hereinafter as the direction of installation V.

For fixing to the spring wires 20 of the spring mat 12, the fixing element 30 has a first eye 52 and a second eye 54, wherein one respective spring wire 20 passes through the eyes 52, 54. Alternative fixing options, for example by clipping or the like, are also conceivable.

A first edge region 42 adjoins the first eye 52 in the lateral direction S and a second edge region 44 adjoins the second eye 54 in the lateral direction S. In the lateral direction S a retaining region 32 is provided between the first edge region 42 and the second edge region 44, adjoining the two edge regions 42, 44.

In this case, the lateral direction S extends perpendicular to the direction of installation V. A further direction which is oriented both perpendicular to the lateral direction S and perpendicular to the direction of installation V, is denoted hereinafter as the direction of insertion E.

The edge regions 42, 44 are of planar configuration and are located in a plane perpendicular to the direction of insertion E. The retaining region 32 is curved away from the plane in which the edge regions 42, 44 are located, in the direction of insertion E. A receiving space 56 in which the cable 50 is installed is formed between this plane and the retaining region 32.

A first gripping arm 34 is attached to the first edge region 42, adjoining the retaining region 32. In this case, the first gripping arm 34 is pivotable about a first pivot axis 38. The first pivot axis 38 is located in the plane in which the edge regions 42, 44 are located and extends in the direction of installation V. Also, a second gripping arm 36 is attached to the second edge region 44, adjoining the retaining region 32. In this case, the second gripping arm 36 is pivotable about a second pivot axis 40, wherein the second pivot axis 40 is also located in the plane in which the edge regions 42, 44 are located and extends in the direction of installation V.

The gripping arms 34, 36 are elastically deformable, in particular the regions of the gripping arms 34, 36 adjacent to the pivot axes 38, 40. Due to this elasticity, the aforementioned pivoting movement about the respective pivot axis 34, 36 is possible.

If the cable 50 is located in the receiving space 56 which is defined by the first gripping arm 34, the second gripping arm 36 and the retaining region 32, as shown in the present exemplary embodiment, the first gripping arm 34 and the second gripping arm 36 are preloaded. By means of said preloading, the gripping arms 34, 36 are pressed onto the retaining region 32. As a result, the gripping arms 34, 36 press the cable 50 which is located in the receiving space 56 against the retaining region 32.

The retaining region 32 comprises a first connecting piece 46 and a second connecting piece 48 which are offset relative to one another in the direction of installation V and extend in parallel. In this case, each connecting piece 46, 48 of the retaining region 32 is connected both to the first edge region 42 and to the second edge region 44.

In the direction of installation V the gripping arms 34, 36 are located between the connecting pieces 46, 48 of the retaining region 32. The first connecting piece 46 of the retaining region 32 in the direction of installation V is thus adjacent to the first gripping arm 34 and the second connecting piece 48 of the retaining region 32 in the direction of installation V is thus adjacent to the second gripping arm 36. The gripping arms 34, 36 are also arranged offset relative to one another in the direction of installation V and extend parallel to one another and to the connecting pieces 46, 48.

The first gripping arm 34, which is arranged adjacent to the first connecting piece 46, is connected in this case to the first edge region 42. The second gripping arm 36, which is arranged adjacent to the second connecting piece 48, is connected in this case to the second edge region 44. The connecting region of the first edge region 42 to the first gripping arm 34 in this case defines the first pivot axis 38 and the connecting region of the second edge region 44 to the second gripping arm 36 defines the second pivot axis 40. A pivoting movement is possible around the respective pivot axes 38, 40, as already mentioned, due to the elasticity of the gripping arms 34, 36.

The free end of the first gripping arm 34 remote from the first pivot axis 38 faces the second edge region 44 and the free end of the second gripping arm 36 remote from the second pivot axis 40 faces the first edge region 42.

For mounting the cable 50 on the fixing element 30, the cable 50 is initially pressed from below in the direction of insertion E against the gripping arms 34, 36. The gripping arms 34, 36 are consequently deflected due to their elasticity, and pivot upward about the pivot axes 38, 40. In this case, the gripping arms 34, 36 are bent upward in the direction of insertion E toward the retaining region 32.

The cable 50 is moved until it bears against the retaining region 32, wherein the gripping arms 34, 36 partially pass through the retaining region 32 between the connecting pieces 46, 48.

Subsequently, the gripping arms 34, 36 are pulled downwardly counter to the direction of insertion E past the cable 50, wherein they pivot back about the pivot axes 38, 40. In this case, the gripping arms 34, 36 slide past the cable 50. Due to the aforementioned preloading, the gripping arms 34, 36 subsequently press the cable 50 against the retaining region 32.

It is also conceivable that the gripping arms 34, 36 are configured to be elastic so that, due to their elasticity, they automatically slide downward past the cable 50.

Alternatively, the cable 50 may also be mounted on the fixing element 30 initially by the gripping arms 34, 36 being pulled downwardly, i.e. counter to the direction of insertion E, wherein they pivot downwards about the pivot axes 38, 40. Subsequently, the cable 50 is guided from below in the direction of insertion E upwardly between the gripping arms 34, 36 until it bears against the retaining region 32. After the gripping arms 34, 36 are released, said gripping arms subsequently press the cable 50 against the retaining region 32 due to the aforementioned preloading.

In the present exemplary embodiment, for additional fixing of the cable 50, the connecting pieces 46, 48 and the gripping arms 34, 36 have a rough surface, in each case on the side facing the cable 50. In the present case, said rough surfaces comprise tooth-shaped, pointed projections 58 which, due to the aforementioned preloading of the gripping arms 34, 36, are slightly buried in the outer skin of the insulation of the cable 50.

Alternatively, the surfaces of the connecting pieces 46, 48 and the gripping arms 34, 36 may also be designed to be smooth or slightly rough. Also mixed embodiments, for example a smooth or slightly rough surface of the connecting pieces 46, 48 and pointed projections 58 on the surfaces of the gripping arms 34, 36 are conceivable.

In the exemplary embodiment shown here, the direction of insertion E corresponds to the vertical direction. The lateral direction S corresponds to the transverse direction and the direction of installation V corresponds to the longitudinal direction. However, naturally other arrangements and designs, in particular of the cable 50, are also conceivable.

Figure 2:
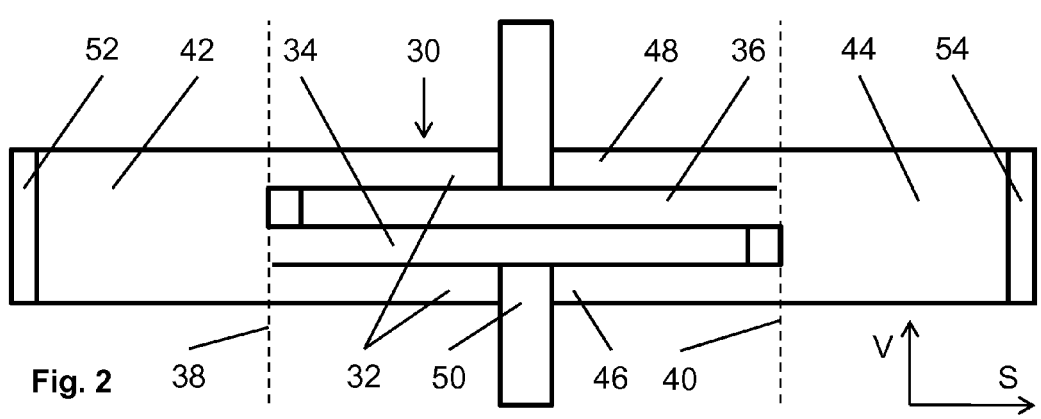
FIG. 2 is a plan view of a fixing element viewed in the direction of insertion.
Figure 3:
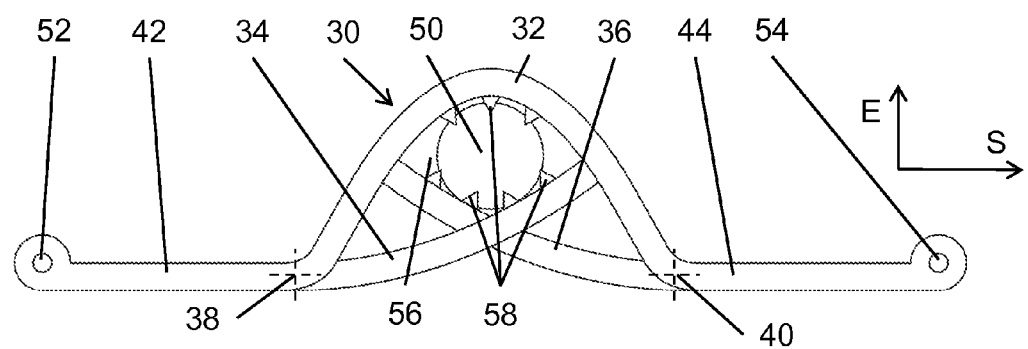
FIG. 3 is a side view of a fixing element viewed in the direction of installation.
Figure 4:
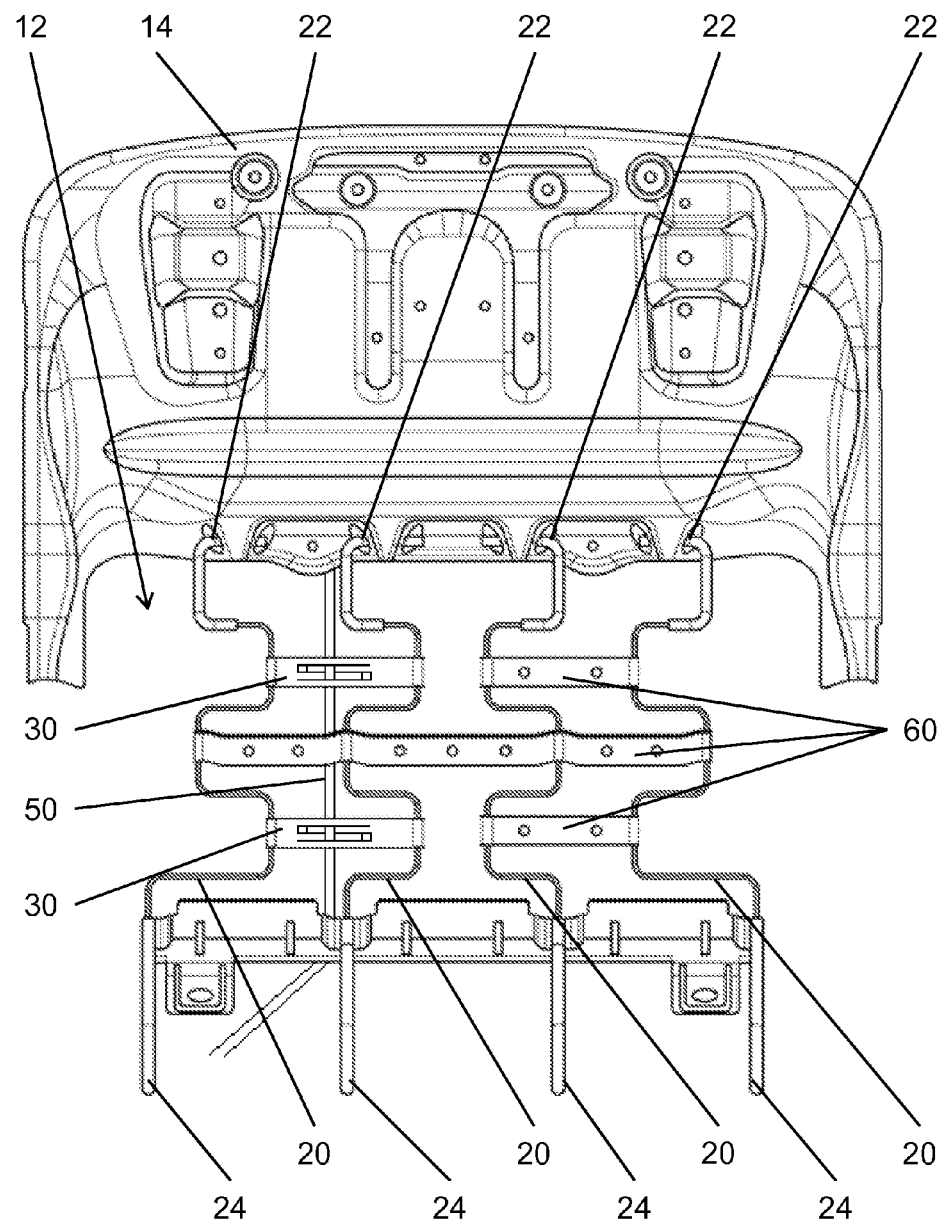
FIG. 4 is a plan view of a spring mat, viewed in the vertical direction from above.

In FIG. 2, the fixing element 30 is shown in the direction of insertion, i.e. in the vertical direction from below. In this case, the connecting pieces 46, 48 of the retaining region 32 are partially concealed by the cable 50 and the cable 50 is partially concealed by the gripping arms 34, 36. In FIG. 4, the fixing elements 30 are shown in the vertical direction from above. In this case, the respective gripping arms 34, 36 are partially concealed by the cable 50 and the cable 50 is partially concealed by the respective connecting pieces 46, 48 of the respective retaining region 32.

The features disclosed in the above description, claims and drawings may be significant both individually and also in combination for implementing the invention in its various embodiments. While specific embodiments of the invention have been shown and described in detail to illustrate the application of the principles of the invention, it will be understood that the invention may be embodied otherwise without departing from such principles.

The invention claimed is:

1. A vehicle seat comprising:
a spring mat comprising:
a cable; and
a fixing element comprising:
a retaining region; and
a gripping arm which is elastically preloaded such that the cable, which is located between the retaining region and the at least one gripping arm, is pressed against the retaining region by the gripping arm.

2. The vehicle seat as claimed in claim 1, wherein the gripping arm and the retaining region adjoin an edge region which is fixed to a spring wire of the spring mat.

3. The vehicle seat as claimed in claim 2, wherein:
the edge region is a first edge region and the gripping arm and the retaining region adjoin a second edge region;
the retaining region is arranged between a first edge region and a second edge region.

4. The vehicle seat as claimed in claim 3, wherein the retaining region has a first connecting piece and a second connecting piece which are adjacent to the gripping arm.

5. The vehicle seat as claimed in claim 4, wherein the first gripping arm and/or the second gripping arm and/or the first connecting piece and/or the second connecting piece have pointed projections for fixing the cable.

6. The vehicle seat as claimed in claim 3, wherein:
the gripping arm is a first gripping arm that adjoins the first edge region;
a second gripping arm adjoins the second edge region;

a free end of the first gripping arm faces the second edge region; and a free end of the second gripping arm faces the first edge region.

7. The vehicle seat as claimed in claim 2, wherein the retaining region, the gripping arm and the edge region comprise one piece.

8. The vehicle seat as claimed in claim 1, wherein the spring mat further comprises:

a plurality of spring wires; and connecting elements connecting together two or more spring wires in a transverse direction, wherein the fixing element is connected to two or more spring wires in a transverse direction.

9. A spring mat according to claim 8, further comprising:

a plurality of spring wires; and connecting elements connecting together two or more spring wires in a transverse direction, wherein the fixing element is connected to two or more spring wires in a transverse direction.

10. The vehicle seat as claimed in claim 1, wherein the gripping arm is pivotable about a pivot axis.

11. A spring mat comprising:

a cable; and a fixing element comprising:

a retaining region; and a gripping arm which is elastically preloaded such that the cable, which is located between the retaining region and the at least one gripping arm, is pressed against the retaining region by the gripping arm.

12. The spring mat as claimed in claim 11, wherein the gripping arm and the retaining region adjoin an edge region which may be fixed to a spring wire of a spring mat.

13. The spring mat as claimed in claim 12, wherein:

the edge region is a first edge region and the gripping arm and the retaining region adjoin a second edge region;

the retaining region is arranged between a first edge region and a second edge region.

14. The spring mat as claimed in claim 13, wherein:

the gripping arm is a first gripping arm that adjoins the first edge region;

a second gripping arm adjoins the second edge region;

a free end of the first gripping arm faces the second edge region; and a free end of the second gripping arm faces the first edge region.

15. The spring mat as claimed in claim 12, wherein the retaining region has a first connecting piece and a second connecting piece which are adjacent to the gripping arm.

16. The spring mat as claimed in claim 15, wherein the first gripping arm and/or the second gripping arm and/or the first connecting piece and/or the second connecting piece have pointed projections for fixing the cable.

17. The spring mat as claimed in claim 12, wherein the retaining region, the gripping arm and the edge region are designed in one piece.

18. The spring mat as claimed in claim 11, wherein the gripping arm is pivotable about a pivot axis.

* * * * *